United States Patent [19]

Kuehn et al.

[11] 3,848,322

[45] Nov. 19, 1974

[54] METHOD OF ATTACHING A FASTENER TO A SUPPORT WITH AN AIR OPERATED GUN

[75] Inventors: Donald E. Kuehn, Bay Village; J. Keith Lyon, Lorain, both of Ohio

[73] Assignee: TRW, Inc., Cleveland, Ohio

[22] Filed: July 23, 1973

[21] Appl. No.: 381,411

Related U.S. Application Data

[62] Division of Ser. No. 154,936, June 21, 1971, Pat. No. 3,776,444.

[52] U.S. Cl............ 29/453, 29/212 R, 29/235, 29/526
[51] Int. Cl............................................. B23p 11/02
[58] Field of Search......... 29/432, 450, 211 R, 453, 29/212 R, 526, 453, 235; 227/130, 149

[56] References Cited
UNITED STATES PATENTS

| | | | |
|---|---|---|---|
| 2,803,871 | 8/1957 | Yelton | 29/235 |
| 2,888,679 | 6/1959 | Peterssen et al. | 227/130 |
| 2,899,935 | 8/1959 | Dalton | 227/130 UX |
| 2,983,255 | 5/1961 | Crooks et al. | 227/130 UX |
| 3,134,981 | 6/1964 | Demetrakopoulos et al. | 227/149 |
| 3,636,707 | 1/1972 | Saari | 227/130 X |
| 3,802,617 | 4/1974 | Berecz | 227/130 X |

Primary Examiner—Charlie T. Moon
Attorney, Agent, or Firm—Allen D. Gutchess, Jr.

[57] ABSTRACT

A loop type fastening mechanism which utilizes an air operated plunger which pushes the fastener into engagement with the support.

The purpose of the above abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principle of the present invention hereinafter described in detail, nor is it intended to be used in interpreting or in any way limiting the scope or fair meaning of claims appended hereto.

8 Claims, 5 Drawing Figures

PATENTED NOV 19 1974 3,848,322

METHOD OF ATTACHING A FASTENER TO A SUPPORT WITH AN AIR OPERATED GUN

This is a division, of application Ser. No. 154,936 filed June 21, 1971, now U.S. Pat. No. 3,776,444.

BACKGROUND OF THE INVENTION

In the past the gasket liner and cover of refrigerators have been fastened together by using screws. More recent, the use of loop type panel fasteners have become popular and these have been attached through the use of hand tools such as a hammer. This method of engagement is extremely inefficient causing damage to either the liner or the cover and also creating irregularity in the engagement of the different parts. The gun disclosed herein, due to the use of stored energy, pushes the fastener into engagement with the liner, gasket and cover. The gun is extremely safe to handle since the push type of operation will not drive a fastener into the free hand of an operator.

SUMMARY OF THE INVENTION

This is a loop type fastening system utilizing an air gun which stores the energy created by the air and then releases it in a pushing type of operation rather than in impact type of operation. The gun automatically inserts and reloads itself at a rate of approximately 40 per minute with continuous operation of up to 2,000 or 3,000 pieces depending on the type of external reservoir.

An object of the present invention is to provide an efficient automatic fastening system for loop type fasteners.

A further object of the present invention is to provide an automatic fastening tool which does not utilize an impact type engagement.

A still further object of the present invention is to provide a loop fastener gun assembly which utilizes a sear type trigger mechanism for releasing the piston and also for deactivating an electrical circuit.

A still further object of the present invention is to provide a trigger mechanism which releases the piston and simultaneously engages the plunger of an electrical switch.

DESCRIPTION OF THE PREFERRED EMBODIMENT

Figure 1:
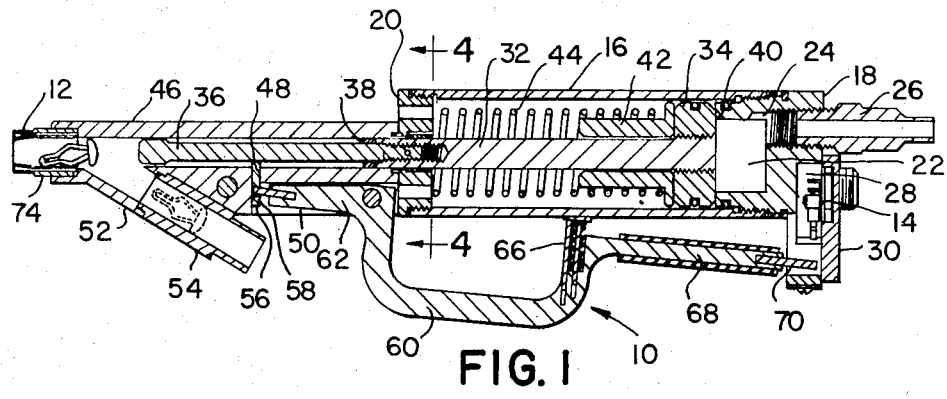
FIG. 1 is a section of the gun assembly showing the position of the different parts prior to the injection of air into the system.
Figure 2:
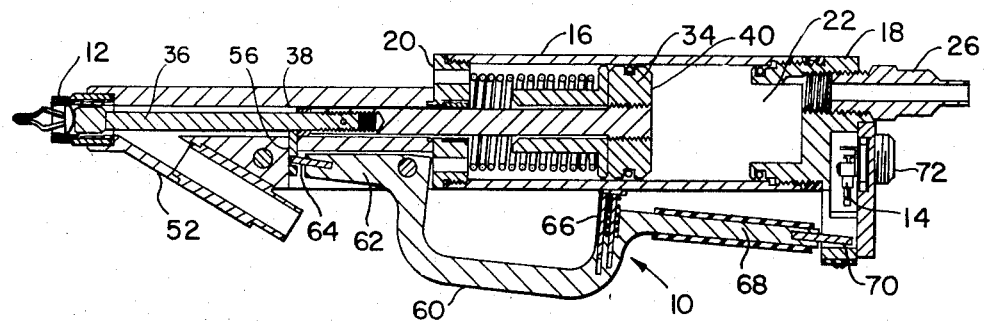
FIG. 2 is a section of the gun shown in FIG. 1 after air has been injected into the system and prior to the actuation of the trigger mechanism.
Figure 3:
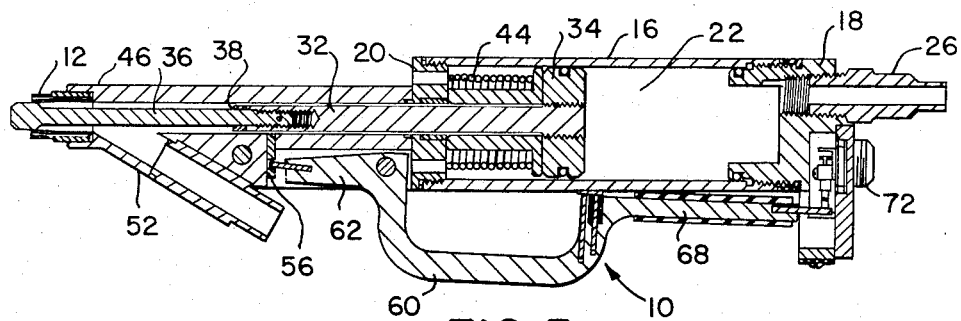
FIG. 3 is a section of the gun shown in FIGS. 1 and 2 showing the gun after the trigger mechanism has been activated.
Figure 4:
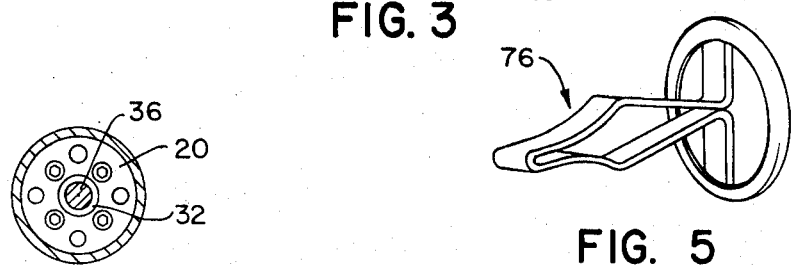
FIG. 4 is a section taken on line 4—4 of FIG. 1.
Figure 5:
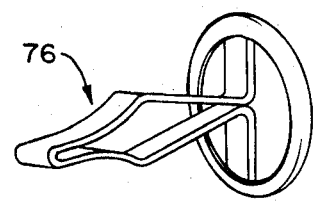
FIG. 5 is a side elevation of the fastener.

In the drawing there is shown a pneumatic gun assembly comprising broadly, a single cavity air cylinder, a sear type trigger mechanism 10, a chuck 12, and a limit switch 14.

The gun proper comprises a tubular housing or body 16 open at both ends and having internal threads formed at each end. One of its ends is closed by a rear cap portion 18 and its other end is closed by a front cap 20. The rear cap portion 18 includes an air well 22 which is fully open at one end and has an air channel 24 which opens into it. The air channel 24 extends through the rear cap portion 18 from the air well 18 through its rear surface as shown in FIG. 1. The wall of the air channel 24 is threaded for part of its length. The rear cap portion 18 is externally threaded and includes an external annular groove within which an O-ring is placed to form an air tight joint with the body 16 with which it is threadingly engaged. A male plug 26 is threaded into engagement with the air channel 24 and has an axial passage formed therethrough. The lower rear portion of the rear cap portion 18 includes a cavity 28 which is closed off at its rear area by a plate 30. A cylindrical rod 32 has a head 34 engaged at one end and a piston 36 engaged at the other. The piston 36 is, at its engagement with the rod 32, of less diameter than the rod 32 forming an external shoulder 38 therewith. The head 34 has an external diameter slightly smaller than the internal diameter of the body 16 and has its upper surface 40 butted against the rear cap portion 18 closing off the air well 22. An annular groove is provided on the external surface of the head 34 within which an O-ring is located forming an air tight engagement with the internal surface of the body 16. The rod 32 and its head 34 are positioned axially within the body 16. A spring stop sleeve 42 has a shank in abutting circumscribing relation to the rod 32 and has a flange at one end which is butted against the front surface of the head 34. The front cap 20 which closes off the formed opening of the body 16 includes air vents which open into the body chamber and a centrally located aperture through which the piston 36 and the rod 32 extend. A compression spring 44 circumscribes the rod 32 and the shank of the spring stop sleeve 42. The compression spring 44 is trapped between the rear surface of the front cap 20 and the flange of the spring stop sleeve 42. A tubular chuck adapter 46 is bolted to the front cap 20 extending axially and forwardly thereof circumscribing the piston 36. The underside of the chuck adapter 46 includes a trigger passage 48 that extends from the adapter inner passage to a trigger slot 50 which lies in spaced parallel relation to the axis and on the underside of the adapter 46. A tubular side port 52 opens into the inner passage of the chuck adapter 46 and is connected to a tubular feed tube adapter 54 which is engageable with a feed tube (not shown). A stop pin 56 having an arced terminal end and a hole 58 formed close to the other end which is fitted into the trigger passage 48.

The trigger mechanism 10 includes an arced handle 60 having a forward extension 62 which has a trigger pin 64 extending therefrom. The back part of the handle 60 contains a spring and finger guide 66 which is spring loaded and adapted to move within channels formed in the handle 60. A rearward arm 68 extends from the back part of the handle 60 and has an actuator member extending therefrom. The trigger mechanism 10 is pinned by its handle 60 to the underside of the body 16 with the forward extension 62 lying in the trigger slot 50, and the terminal end of the trigger pin 64 is engaged within the hole 58 of the stop 56. The spring and finger guide 66 is butted against the outer surface of the body 16 and the actuator member 70 of the rearward arm 66 lies in the cavity 28 of the rear cap portion 18.

The limit switch 14 is attached to the rear cap portion 18 with its plunger directed toward and engagable with the actuator member 70 of the trigger mechanism 10. The limit switch 14 is electrically attached to the terminal socket 72 which in turn is attached to a source of electricity (not shown).

The necked down chuck 12 slotted to allow efficient engagement with a fastener is placed at the forward end of the chuck adapter 46 as shown in FIG 1. A chuck nut 74, which is threadingly engaged with the chuck adapter 46 circumscribes the chuck 12 and seares it in position.

The gun operates when air is passed through the male plug 26 into the air well 22 of the rear cap portion 18. The air presses against the rear surface of the head 34 moving the rod 32 and piston 36 forward until the external shoulder 38 butts against the stop pin 56. The forward movement of the head 34 compresses the spring 44 and blocks the opening into the side portion 52 with the piston 36. Additional air is pumped into the air well 22 and the chamber behind the head 34 urging the head to move forward and moving the external shoulder 38 against the stop pin 56. Prior to the injection of air through the male plug 26, a fastener 76 was fed through the side port 52 and this fastener 76 was pushed by the terminal end of the piston 36 into engagement with the chuck 12. If the trigger mechanism were now to be squeezed, compressing the spring of the spring and finger guide 66, the trigger pin 64 would move withdrawing the stop pin 56 from its engagement with the shoulder of the piston 36. The piston 36 would be pushed forward driving the fastener 76 into engagement with an apertured support. At the same time the actuator member 70 engages the plunger of the limit switch 14.

A simple valve system (not shown) operates when the trigger is released allowing the switch 14 to reset initiating the air cycle by first exhausting the body 16 and the air well 22 of air which allows the compression spring 44 to return the rod 32 to its original position. Simultaneously with this action the valve, for an adjustable time period allows air into the delivery system pushing a fastener through an escapement (not shown) into the side port 52 and into the chuck assembly 12. The valve then directs the air into the male plug 26 starting the fastening cycle.

With reference to the foregoing description it is to be understood that what has been disclosed herein represents an embodiment of the invention and is to be construed as illustrative rather than restrictive in nature and that the invention is best described by the following claims;

We claim:

1. The method of attaching a fastener to a support with a tool having a housing forming an inner passage with a chuck at an end thereof and a fastener opening spaced rearwardly of the chuck, said method comprising positioning a plunger in a first position in said passage to the rear of said fastener opening, feeding a fastener through the opening and into said chuck, moving said plunger forwardly by applying a fluid force against a piston connected with said plunger and stopping said plunger in a second position with the forward end adjacent the fastener in the chuck by means of a stop extending into said passage, continuing an application of the fluid force on the piston, and retracting the stop from said passage to enable the piston to move the plunger forwardly to a third position substantially through said chuck to push the fastener out of the chuck and into engagement with the support.

2. A method of attaching a fastener according to claim 1 characterized by removing the fluid force from the piston after the piston has moved the plunger to the third position, and moving the plunger back to the first position.

3. The method according to claim 2 characterized by moving said plunger back to the first position by applying a resilient force to the piston on the side thereof opposite the side to which the fluid force is applied.

4. A method of attaching a fastener to a support comprising feeding the fastener to the forward end of a chuck, applying a force against a plunger behind said chuck to move said plunger to a position immediately adjacent the fastener, stopping the plunger in the latter position while continuing the application of the force, and subsequently releasing the plunger to enable the plunger to move forwardly and push the fastener into engagement with the support.

5. The method of attaching the fastener according to claim 4 characterized by connecting a piston with the plunger, and applying the force against the piston to cause the movement of said plunger.

6. The method of attaching the fastener according to claim 4 wherein said force is a fluid force.

7. The method according to claim 6 characterized by removing the fluid force after the plunger has pushed the fastener into engagement with the support, and moving said plunger back to the original position.

8. The method according to claim 4 characterized by stopping the plunger in the latter position by moving a stop into its path, and releasing the plunger by removing the stop from the plunger path.

* * * * *